United States Patent
Lenz et al.

(10) Patent No.: US 9,208,127 B2
(45) Date of Patent: *Dec. 8, 2015

(54) METHOD FOR OPERATING A VEHICLE POWERTRAIN

(71) Applicant: Ford Global Technologies, LLC, Dearborn, MI (US)

(72) Inventors: Ingo Lenz, Cologne (DE); Chris Connelly, Essex (GB); Chris Edward Pedlar, Essex (GB); Rainer Busch, Aachen (DE); Urs Christen, Aachen (DE); Baekhyun ("Harry") Cho, Essex (GB)

(73) Assignee: Ford Global Technologies, LLC, Dearborn, MI (US)

( * ) Notice: Subject to any disclaimer, the term of this patent is extended or adjusted under 35 U.S.C. 154(b) by 381 days.

This patent is subject to a terminal disclaimer.

(21) Appl. No.: 13/662,441

(22) Filed: Oct. 27, 2012

(65) Prior Publication Data

US 2013/0116903 A1    May 9, 2013

(30) Foreign Application Priority Data

Oct. 28, 2011    (DE) .......................... 10 2011 085 395

(51) Int. Cl.
| | |
|---|---|
| *F16H 59/36* | (2006.01) |
| *F16H 59/50* | (2006.01) |
| *B60W 10/06* | (2006.01) |
| *B60W 30/18* | (2012.01) |
| *G06F 17/00* | (2006.01) |
| *B60W 10/02* | (2006.01) |
| *F02N 11/08* | (2006.01) |
| *B60W 50/00* | (2006.01) |

(52) U.S. Cl.
CPC .............. *G06F 17/00* (2013.01); *B60W 10/02* (2013.01); *B60W 10/06* (2013.01); *B60W 30/18018* (2013.01); *B60W 30/18063* (2013.01); *B60W 30/18072* (2013.01); *F02N 11/08* (2013.01); *B60W 2050/0075* (2013.01); *B60W 2520/10* (2013.01)

(58) Field of Classification Search
None
See application file for complete search history.

(56) References Cited

U.S. PATENT DOCUMENTS

| | | | | |
|---|---|---|---|---|
| 5,314,050 | A * | 5/1994 | Slicker et al. .................. | 477/171 |
| 2009/0005218 | A1* | 1/2009 | Lowe et al. .................... | 477/116 |
| 2010/0012085 | A1* | 1/2010 | Albrecht ........................ | 123/350 |
| 2010/0063693 | A1* | 3/2010 | Lee et al. .......................... | 701/54 |
| 2010/0063694 | A1* | 3/2010 | Lee et al. .......................... | 701/54 |
| 2010/0145562 | A1* | 6/2010 | Moran ............................ | 701/22 |
| 2011/0136625 | A1* | 6/2011 | Yu et al. .......................... | 477/185 |
| 2012/0072065 | A1* | 3/2012 | Minamikawa et al. .......... | 701/22 |

(Continued)

FOREIGN PATENT DOCUMENTS

| | | |
|---|---|---|
| DE | 10221701 A1 | 11/2002 |
| DE | 60306411 T2 | 12/2006 |

(Continued)

*Primary Examiner* — Yonel Beaulieu
*Assistant Examiner* — Krishnan Ramesh
(74) *Attorney, Agent, or Firm* — Carlson, Gaskey & Olds

(57) ABSTRACT

A method of operating a vehicle powertrain, includes: sensing a vehicle speed; selecting a plurality of control strategies; activating one of the plurality of control strategies, the control strategy including: (i) operating the vehicle in a stationary start-stop mode when the vehicle speed is below a first threshold; and (ii) operating the vehicle in a rolling stationary start-stop mode when the vehicle speed is above the first threshold but below a second threshold.

21 Claims, 1 Drawing Sheet

(56) References Cited

U.S. PATENT DOCUMENTS

| | | |
|---|---|---|
| 2012/0103749 A1* | 5/2012 | Kimura et al. ............... 192/54.1 |
| 2012/0179357 A1* | 7/2012 | Phillips ......................... 701/112 |
| 2012/0197503 A1* | 8/2012 | McGee et al. .................. 701/54 |
| 2012/0220424 A1* | 8/2012 | Staudinger et al. ............. 477/80 |
| 2014/0296026 A1* | 10/2014 | Wenzel et al. ................... 477/5 |

FOREIGN PATENT DOCUMENTS

| | | |
|---|---|---|
| WO | WO2005084995 A1 | 9/2005 |
| WO | WO2010121861 A1 | 10/2010 |

* cited by examiner

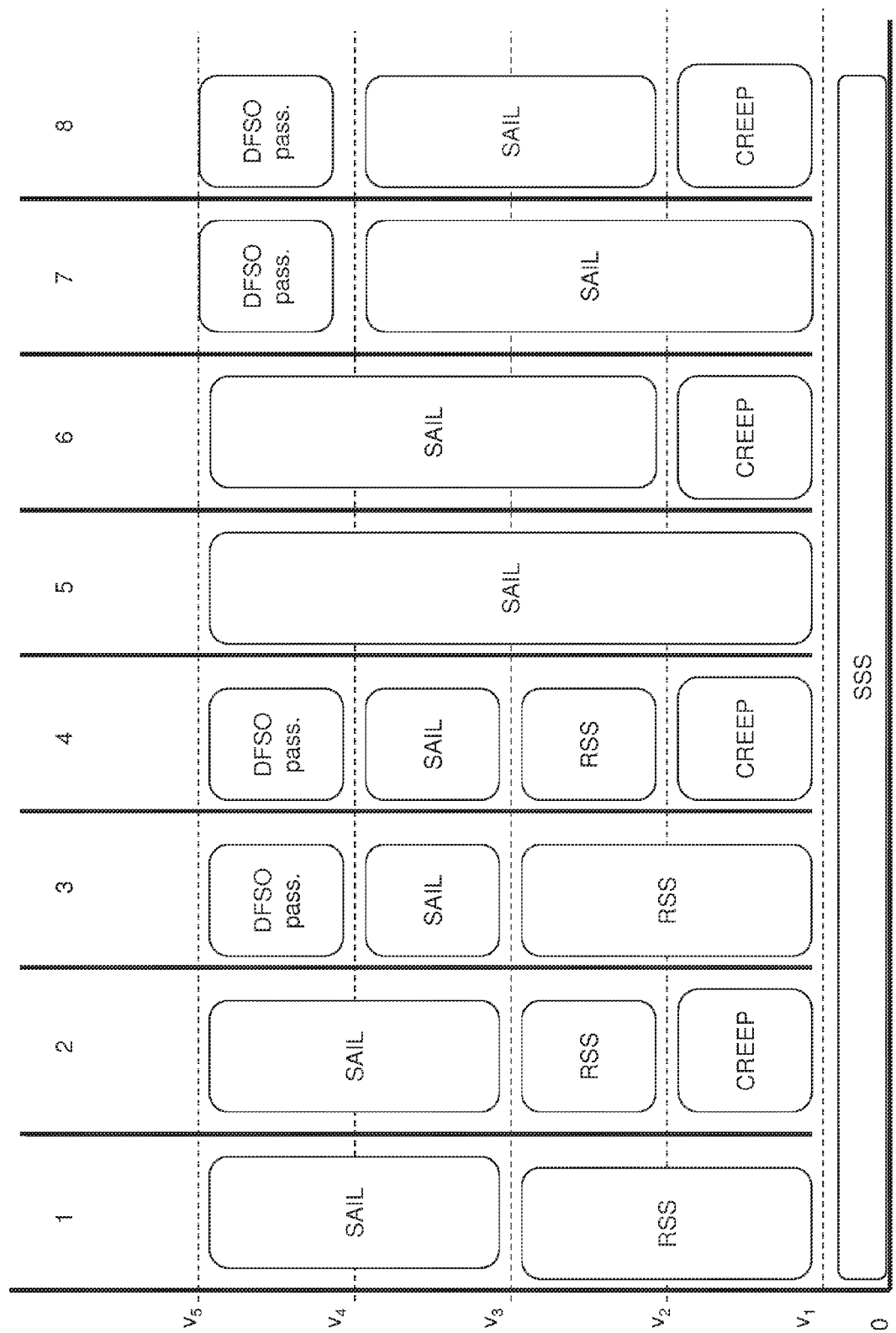

METHOD FOR OPERATING A VEHICLE POWERTRAIN

CROSS-REFERENCE TO RELATED APPLICATIONS

This application is a continuation and claims the benefit of German Patent Application No. DE 102011085395.2 titled "Method for Operating a Motor Vehicle and Drive System of a Motor Vehicle," filed Oct. 28, 2011; and U.S. patent application Ser. No. 13/659,833 titled "Method for Operating a Vehicle Powertrain" filed Oct. 24, 2012, which are hereby incorporated in their entirety.

TECHNICAL FIELD

The present disclosure relates to vehicle powertrain control strategies. More particularly, the disclosure relates to a method for operating a motor vehicle having an internal combustion engine and to a drive system of the motor vehicle.

BACKGROUND

The drive motor of a motor vehicle serves primarily for generating a driving force which is transmitted to at least one driven wheel in order to move the motor vehicle. Modern drive motors include, for example, an internal combustion engine such as a spark-ignition engine or diesel engine. Since an internal combustion engine consumes fuel even when not transmitting a drive force, various methods have been proposed to reduce fuel consumption in driving situations were no driving force is required.

It is known, for example, from WO 2010/121861 A1 titled "Method for Operating a Vehicle Having a Freewheel Mode or a Rolling Mode", to operate a vehicle as a function of the result of a plausibility check of an automatic speed control function or adaptive speed control function and/or other current vehicle operating data or vehicle state data in a driving mode in where frictional engagement in the drive train is interrupted and the drive motor is operated at an idling speed or switched off. However, this method does not optimize fuel efficiency and engine responsiveness in all driving situations.

Therefore it is desirable to provide a method for operating a motor vehicle that improves fuel efficiency and engine responsiveness in all driving situations.

SUMMARY

The present disclosure addresses one or more of the above-mentioned issues. Other features and/or advantages will become apparent from the description which follows.

One exemplary embodiment of the present disclosure relates to a method of operating a vehicle powertrain, the method includes: sensing a vehicle speed; selecting a plurality of control strategies; activating one of the plurality of control strategies, the control strategy including: (i) operating the vehicle in a stationary start-stop mode when the vehicle speed is below a first threshold; and (ii) operating the vehicle in a rolling stationary start-stop mode when the vehicle speed is above the first threshold but below a second threshold.

One exemplary embodiment of the present disclosure relates to a method for operating a motor vehicle having an internal combustion engine, the method includes: sensing a speed of the motor vehicle; sensing actuation of a speed control means; selecting a coasting mode when the vehicle is operating above a minimum speed of said coasting mode and the speed control means is not actuated; selecting a rolling mode when the vehicle is operating above a maximum speed of the coasting mode and the speed control means is not actuated; and selecting a creeping mode in which there is frictional engagement between the drive motor and at least one driven wheel of the motor vehicle, when the vehicle is operating above the maximum speed of a stationary mode and below a minimum speed of the rolling mode and when the speed control means is not actuated.

Another exemplary embodiment of the present disclosure relates to a drive system of a motor vehicle having a drive motor, including: a drive train for transmitting driving force to at least one driven wheel of the motor vehicle; and a control device for controlling the drive motor and an automatically actuable clutch, wherein the control device is designed to: (i) select a coasting mode above a minimum speed of said coasting mode when a speed control means is not actuated; (ii) select a rolling mode above a maximum speed of the coasting mode when the speed control means is not actuated; and (iii) select a creeping mode in which there is frictional engagement between the drive motor and at least one driven wheel of the motor vehicle, when the vehicle is operating above the maximum speed of a stationary mode and below a minimum speed of the rolling mode and when the speed control means is not actuated.

One advantage of the present disclosure is that it provides a method and drive system in which the fuel consumption is reduced without complex adaptation of the energy supply system being necessary and without significant impairment of the response behavior of the drive system.

The invention will be explained in greater detail below by way of example with reference to the figures, in which the same reference numbers are used in the figures for identical or essentially identical elements. The above features and advantages and other features and advantages of the present invention are readily apparent from the following detailed description of the best modes for carrying out the invention when taken in connection with the accompanying drawings. In the figures:

BRIEF DESCRIPTION OF THE DRAWINGS

FIG. 1 shows a collection of driving strategies corresponding to exemplary embodiments of the method according to the invention.

DETAILED DESCRIPTION

Referring to the drawing, wherein like characters represent examples of the same or corresponding parts throughout the several views, there is shown a series of control strategies for a vehicle powertrain. The control strategies provide different fuel-savings and/or improve engine responsiveness in different driving conditions. Control strategies can be implemented by a control device, such as for example, an engine control unit (or ECU), powertrain control unit (PCU) or vehicle control unit (VCU). The various strategies include several different driving modes, examples of which are discussed hereinbelow, that are actuated according to the control strategy. The exemplary strategies below trigger driving modes according to vehicle speed and/or operation of cruise control (or a "coasting mode").

Referring now to FIG. 1, FIG. 1 illustrates several different driving strategies (four of which are discussed in detail hereinbelow) according to which a motor vehicle can be operated and a drive system of a motor vehicle can be correspondingly actuated. In this embodiment, a current velocity of the motor vehicle is plotted on the y-axis. On the top the different strategies 1 to 8 are illustrated, denoted by the numbers above the corresponding column.

In the shown driving strategies of FIG. 1, a drive system is actuated in a stationary mode (SSS, "Static Start Stop") when the vehicle is operating at a velocity below a speed, $v_1$. The stationary mode is defined by an interrupted frictional engagement in the drive train. In the case of an automatic transmission with a torque converter, the frictional engagement can be closed via a torque converter. An internal combustion engine that serves as the drive motor is stopped in the stationary mode. A starter of the internal combustion engine can be disconnected from the engine by opening a starter clutch. The starter can also be engaged in order to expedite starting. If there is a request for driving force, for example, detected by actuation of the gas pedal, the internal combustion engine is started by the starter after the starter clutch has been closed, and the opened clutch in the drive train is closed and/or manual closing of the clutch is enabled.

According to strategy 1, as shown in FIG. 1, the rolling mode (RSS, "Rolling Start Stop") is selected starting from a velocity, $v_1$, which corresponds to the maximum speed of the stationary mode and the minimum speed of the rolling mode when neither the brake pedal nor the gas pedal is actuated. In the rolling mode, the drive system is actuated by a control device in such a way that frictional engagement in the drive train is interrupted, for example, by opening a clutch and the drive motor is stopped. The starter can be connected to the drive motor in order to start the engine when necessary, for example when the gas pedal is actuated.

Starting from a velocity $v_3$, as shown in FIG. 1, which represents the maximum speed of the rolling mode and the minimum speed of the coasting mode, a coasting mode ("SAIL") is selected if neither the brake pedal nor the gas pedal is actuated. In the coasting mode, frictional engagement in the drive train is interrupted. In contrast to the rolling mode, the drive motor is in operation in the coasting mode, in particular at an idling speed. The starter is not connected to the drive motor. The coasting mode can be used up to a maximum speed $v_5$ of the motor vehicle. In other embodiments, $v_5$ can be lower.

A transition from one driving mode to another can take place by changing vehicle speed, for example, by slowing down and allowing the vehicle to come to a standstill or by increasing the speed when driving downhill. A driving mode can also be ended by actuating the gas pedal or the brake pedal. Likewise, it is possible to end a driving mode by deactivating an economy driving settings, by means of software or hardware switches, such as start/stop or on/off buttons. Other reasons for changing the driving mode can be, for example, passenger comfort and/or air conditioning, the state of charge for the battery, emission control of the engine, current altitude, ambient temperature, or engine temperature.

According to strategy 2, as shown in FIG. 1, the maximum speed $v_1$ of the stationary mode corresponds to the minimum speed of a creeping mode ("CREEP"). The maximum speed $v_2$ of the creeping mode is the minimum speed of the rolling mode. As is apparent from FIG. 1, according to strategy 2, the creeping mode is selected between the minimum speed and the maximum speed of the creeping mode $v_1$ and $v_2$ if neither the brake pedal nor the gas pedal is actuated. In the creeping mode, frictional engagement between the drive motor and the driven wheels is closed, the drive motor is operating at a corresponding rotational speed and the starter is disconnected from the drive motor. Above the maximum speed $v_2$ of the creeping mode the driving strategy 2 corresponds to strategy 1.

According to strategy 3, as shown in FIG. 1, the coasting mode is used up to a maximum speed $v_4$. In the case of a velocity which is higher than $v_4$, a passive deceleration mode ("DFSO Pass." or "Deceleration Fuel Shut Off") is selected provided that the driver does not actuate the brake pedal or the gas pedal. In the passive deceleration mode, the frictional engagement in the drive train is brought about by closing a corresponding clutch so that the drive motor runs at a rotational speed which corresponds to the current velocity of the vehicle and to a respectively engaged gear or a respective driving position, taking into account the slip of a torque converter if using an automatic transmission. The fuel supply to the internal combustion engine is, however, interrupted so that a deceleration effect of the engine occurs, and the effect is used according to driving strategy 3 to control coming to a standstill or driving downhill. The starter is not connected to the drive motor. The passive deceleration mode is used up to the maximum speed, $v_5$, of the motor vehicle. In the case of a velocity below, $v_4$, driving strategy 3 corresponds to strategy 1.

As is shown by FIG. 1, strategy 4 corresponds to strategy 2 when there is a speed below $v_3$ and to strategy 3 when there is a speed above $v_3$. In this respect, reference is made to the above explanations.

The speeds $v_1$ to $v_5$ do not have to have the same values in all the strategies. The speeds $v_1$ to $v_5$ can also depend on further parameters which characterize the respective driving situation. The strategies can each be configured in such a way that in the case of a velocity which is equal to a maximum speed or minimum speed, the driving mode which is assigned to the relatively low or relatively high velocity is selected. The speed at which another driving mode is selected can also be different in the case of a transition in the direction of a relatively high speed than in the case of a transition in the direction of a relatively low speed.

When the brake pedal is actuated, a driving mode (not illustrated in FIG. 1), for example, an active deceleration mode which corresponds to the passive deceleration mode but includes an additional braking effect by the service brakes, can be selected. The selected driving mode can also depend on the current speed, further parameters of the vehicle or the driving situation. In addition, a driver can, in particular by actuating the gas pedal, bring about a change into the normal driving mode in which the motor vehicle is accelerated, for example, by a driving force which is generated in accordance with the position of the gas pedal, or one that is kept at a constant velocity.

Other driving strategies, for example, as shown in columns 5 through 8 can also be implemented. Those familiar with the art to which this invention relates will recognize various alternative designs and embodiments for practicing the invention within the scope of the appended claims.

We claim:

1. A method of operating a vehicle powertrain, comprising:
   sensing a vehicle speed;
   selecting a plurality of control strategies;
   activating one of the plurality of control strategies, the control strategy including:
   (i) operating the vehicle in a stationary start-stop mode when the vehicle speed is below a first threshold; and
   (ii) operating the vehicle in a rolling start-stop mode when the vehicle speed is above the first threshold but below a second threshold.

2. The method of claim 1, wherein the control strategy further includes: (iii) operating the vehicle in a creeping mode when the vehicle speed is below a third threshold and above the first threshold, the third threshold being less than the second threshold.

3. The method of claim 2, wherein the control strategy further includes: (iv) operating the vehicle in a sailing mode when the vehicle speed is above the second threshold.

4. The method of claim 3, wherein the control strategy further includes: (v) operating the vehicle in a passive deceleration fuel shut-off mode when the vehicle speed is above a fourth threshold, the fourth threshold being greater than the second threshold.

5. The method of claim 1, wherein the control strategy further includes: (iii) operating the vehicle in a sailing mode when the vehicle speed is above the second threshold.

6. The method of claim 5, wherein the control strategy further includes: (iv) operating the vehicle in a passive deceleration fuel shut-off mode when the vehicle speed is above a third threshold, the third threshold being greater than the second threshold.

7. The method of claim 1, wherein the control strategy further includes: (iii) operating the vehicle in a passive deceleration fuel shut-off mode when the vehicle speed is above a third threshold, the third threshold being greater than the second threshold.

8. A method for operating a motor vehicle having an internal combustion engine, comprising:
sensing a speed of the motor vehicle;
sensing actuation of a speed control means;
selecting a coasting mode when the vehicle is operating above a minimum speed of said coasting mode and the speed control means is not actuated;
selecting a rolling mode when the vehicle is operating below said minimum speed of the coasting mode and the speed control means is not actuated; and
selecting a creeping mode in which there is frictional engagement between a drive motor and at least one driven wheel of the motor vehicle, when the vehicle is operating above a maximum speed of a stationary mode and below a minimum speed of the rolling mode and when the speed control means is not actuated.

9. The method as claimed in claim 8, further comprising:
selecting the stationary mode when the vehicle is operating below a maximum speed of said stationary mode and the speed control means is not actuated; and
selecting the rolling mode when the vehicle is operating above the maximum speed of the stationary mode and below the minimum speed of the coasting mode and the speed control means is not actuated.

10. The method as claimed in claim 8, wherein when in the stationary mode or the rolling mode connecting an electric starter to the internal combustion engine.

11. The method as claimed in claim 8, further comprising:
selecting a passive deceleration mode, in which there is frictional engagement between the drive motor and at least one driven wheel of the motor vehicle, and a supply of fuel to the drive motor is interrupted, when the vehicle is operating above a maximum speed of the coasting mode and when the speed control means is not actuated.

12. The method as claimed in claim 11, further comprising: actuating the speed control means and driving mode selection via a brake pedal.

13. The method as claimed in claim 12, further comprising: ceasing frictional engagement between the drive motor and at least one driven wheel of the motor vehicle is interrupted and the drive motor.

14. The method as claimed in claim 11, further comprising:
selecting an idling mode in which frictional engagement between the drive motor and at least one driven wheel of the motor vehicle is interrupted.

15. The method as claimed in claim 11, further comprising:
interrupting frictional engagement between the drive motor and at least one driven wheel of the motor vehicle; and
operating the drive motor at a rotational speed that corresponds to a rotational speed of a motor-side drive shaft of a transmission.

16. The method as claimed in claim 8, further comprising:
selecting an active deceleration mode in which there is frictional engagement between the drive motor and at least one driven wheel of the motor vehicle and the supply of fuel to the drive motor is interrupted.

17. The method of claim 8, further comprising:
connecting an electric starter to the internal combustion engine.

18. A drive system of a motor vehicle having a drive motor, comprising:
a drive train for transmitting driving force to at least one driven wheel of the motor vehicle; and
a control device for controlling the drive motor and an automatically actuable clutch, wherein the control device is designed to: (i) select a coasting mode above a minimum speed of said coasting mode when a speed control means is not actuated; (ii) select a rolling mode below said minimum speed of the coasting mode when the speed control means is not actuated; and (iii) select a creeping mode in which there is frictional engagement between the drive motor and at least one driven wheel of the motor vehicle, when the vehicle is operating above a maximum speed of a stationary mode and below a minimum speed of the rolling mode and when the speed control means is not actuated.

19. The drive system as claimed in claim 18, wherein the control device is further configured to: (iv) select the stationary mode when the vehicle is operating below a maximum speed of said stationary mode and the speed control means is not actuated; and (v) select the rolling mode when the vehicle is operating above the maximum speed of the stationary mode and below the minimum speed of the coasting mode and the speed control means is not actuated.

20. The drive system as claimed in claim 18, wherein the control device is further configured to: select a passive deceleration mode, in which there is frictional engagement between the drive motor and at least one driven wheel of the motor vehicle, and a supply of fuel to the drive motor is interrupted, when the vehicle is operating above a maximum speed of the coasting mode and when the speed control means is not actuated.

21. A method for operating a motor vehicle having an internal combustion engine, comprising:
selecting a coasting mode above a minimum speed of said coasting mode when a brake pedal and a gas pedal are not actuated, said internal combustion engine running during said coasting mode;
selecting a rolling mode below said minimum speed of said coasting mode when said brake pedal and said gas pedal are not actuated, said internal combustion engine stopped during said rolling mode; and
selecting a creeping mode below a minimum speed of said rolling mode when said brake pedal and said gas pedal are not actuated, said internal combustion engine running during said creeping mode.

* * * * *